United States Patent
Han et al.

(10) Patent No.: US 11,656,979 B2
(45) Date of Patent: May 23, 2023

(54) DATA TIERING IN HETEROGENEOUS MEMORY SYSTEM

(71) Applicant: SK hynix Inc., Gyeonggi-do (KR)

(72) Inventors: Miseon Han, San Jose, CA (US); Hyung Jin Lim, San Jose, CA (US); Jongryool Kim, San Jose, CA (US); Myeong Joon Kang, San Jose, CA (US)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 17/559,962

(22) Filed: Dec. 22, 2021

(65) Prior Publication Data

US 2022/0197787 A1    Jun. 23, 2022

Related U.S. Application Data

(60) Provisional application No. 63/129,087, filed on Dec. 22, 2020.

(51) Int. Cl.
*G06F 12/02* (2006.01)
*G06F 12/0815* (2016.01)

(52) U.S. Cl.
CPC ...... *G06F 12/0223* (2013.01); *G06F 12/0815* (2013.01); *G06F 2212/604* (2013.01); *G06F 2212/608* (2013.01)

(58) Field of Classification Search
None
See application file for complete search history.

(56) References Cited

U.S. PATENT DOCUMENTS

| 10,235,290 B2 | 3/2019 | Blagodurov et al. | |
| 10,248,576 B2 | 4/2019 | Jin et al. | |
| 2012/0072652 A1* | 3/2012 | Celis | G06F 12/0893 711/159 |
| 2013/0290607 A1* | 10/2013 | Chang | G06F 9/3842 711/144 |
| 2015/0199126 A1* | 7/2015 | Jayasena | G06F 12/0292 711/170 |
| 2016/0085585 A1* | 3/2016 | Chen | G06F 12/0638 711/205 |
| 2016/0342363 A1* | 11/2016 | Krause | G06F 3/0683 |
| 2019/0042145 A1* | 2/2019 | Pham | G06F 3/0683 |
| 2019/0179763 A1* | 6/2019 | Lo | G06F 12/06 |
| 2019/0243771 A1 | 8/2019 | Mittal et al. | |
| 2021/0064543 A1* | 3/2021 | Yang | G06F 12/0253 |

OTHER PUBLICATIONS

Intel Optane DC Persistent Memory, Quick Start Guide, Jun. 2020, Revision 1.1.

(Continued)

Primary Examiner — Kaushikkumar M Patel
(74) Attorney, Agent, or Firm — IP & T Group LLP

(57) ABSTRACT

A heterogeneous memory system includes a memory device including first and second memories and a controller including a cache. The controller identifies memory access addresses among addresses for memory regions of the memory device; track, for a set period, a number of memory accesses for each memory access address; classify each memory access address into a frequently accessed address or a normal accessed address based on the number of memory accesses in the set period; and allocate the first memory for frequently accessed data associated with the frequently accessed address and the second memory for normal data associated with the normal accessed address.

18 Claims, 12 Drawing Sheets

(56) References Cited

OTHER PUBLICATIONS

Fan L. et al., Summary Cache: A Scalable Wide-Area Web Cache Sharing Protocol, ACM Transactions on Networking, Jun. 2020, pp. 281-293, vol. 8, No. 2, IEEE.

Si S K et al., Optimize Redis with NextGen NVM, Sep. 24-27, 2018, SDC 18, Santa Clara, CA.

Cooper B F et al., Benchmarking cloud serving systems with YCSB, Jun. 2010, pp. 143-154, SoCC' 1: Proceedings of the 1st ACM symposium on Cloud computing.

Bruening D et al., An Infrastructure for Adaptive Dynamic Optimization, Mar. 2003, pp. 265-275, CGO '03: Proceedings of the international symposium on Code generation and optimization: feedback-directed and runtime optimization.

Weaver V M et al., Advanced Hardware Profiling and Sampling (PEB, IBS, etc.): Creating a New PAPI Sampling Interface, UMaine VMW Group Tech Report, Aug. 2016.

Gogte V., et al., Software Wear Management for Persistent Memories, Feb. 25-28, 2019, pp. 45-63, Proceedings of the 17th USENIX Conference on File and Storage Technologies (FAST '19), Boston, MA, USA.

Bloom B H, Space/Time Trade-offs in Hash Coding with Allowable Errors, Jul. 1970, pp. 422-426, vol. 13, No. 7, Communication of the ACM.

Fan C., Persistent Memory+Data Services=Big Memory, Sep. 2020, SDC 2020.MemVerge.

Izraelevitz J et al., Basic Performance Measurements of the Intel Optane DC Persistent Memory Module, Aug. 2019, Version 3.

\* cited by examiner

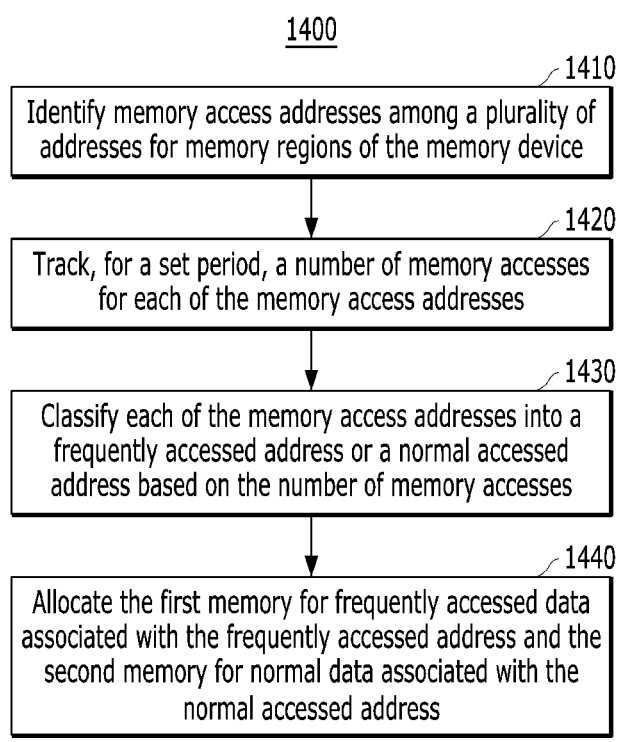

DATA TIERING IN HETEROGENEOUS MEMORY SYSTEM

CROSS-REFERENCE TO RELATED APPLICATION

This application claims the benefit of U.S. Provisional Patent Application No. 63/129,087, filed on Dec. 22, 2020, the entire contents of which are incorporated herein by reference.

BACKGROUND

1. Field

Embodiments of the present disclosure relate to a scheme of improving performance in a heterogeneous memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Computer systems have adopted heterogeneous memory systems to guarantee requests of various performances due to the advent of various applications. In a heterogeneous memory system environment, if frequently accessed data is allocated to a relatively low speed memory, overall performance may be deteriorated or degraded compared to single memory system environment. Thus, a scheme is desirable to avoid performance degradation of heterogeneous memory system environment. In this context, embodiments of the present invention arise.

SUMMARY

Aspects of the present invention include a data tiering system and a method for improving performance of heterogeneous memory system environment.

In one aspect, a heterogeneous memory system includes a memory device and a controller including a cache. The memory device includes a first memory supporting a first speed and a first capacity, and a second memory supporting a second speed slower than the first speed and a second capacity greater than the first capacity. The controller is configured to: identify memory access addresses among a plurality of addresses for memory regions of the memory device; track, for a set period, a number of memory accesses for each of the memory access addresses; classify each of the memory access addresses into a frequently accessed address or a normal accessed address based on the number of memory accesses in the set period; and allocate the first memory for frequently accessed data associated with the frequently accessed address and allocate the second memory for normal data associated with the normal accessed address.

In another aspect, a method operates a heterogeneous memory system including a memory device and a controller including a cache. The memory device includes a first memory supporting a first speed and a first capacity, and a second memory supporting a second speed slower than the first speed and a second capacity greater than the first capacity. The method includes: identifying memory access addresses among a plurality of addresses for memory regions of the memory device; tracking, for a set period, a number of memory accesses for each of the memory access addresses; classifying each of the memory access addresses into a frequently accessed address or a normal accessed address based on the number of memory accesses in the set period; and allocating the first memory for frequently accessed data associated with the frequently accessed address and allocating the second memory for normal data associated with the normal accessed address.

Additional aspects of the present invention will become apparent from the following description.

BRIEF DESCRIPTION OF THE DRAWINGS

FIG. 14 is a flowchart illustrating an operation a data tiering controller in accordance with yet another embodiment of the present invention.

DETAILED DESCRIPTION

Figure 1:
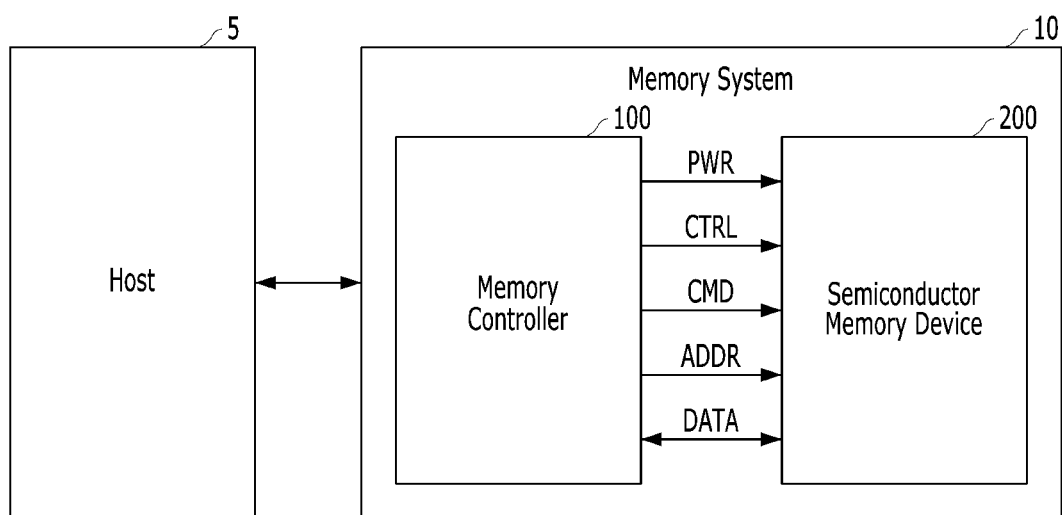
FIG. 1 is a block diagram illustrating a data processing system.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure conveys the scope of the present invention to those skilled in the art. Moreover, reference herein to "an embodiment," "another embodiment," or the like is not necessarily to only one embodiment, and different references to any such phrase are not necessarily to the same embodiment(s). The term "embodiments" as used herein does not necessarily refer to all embodiments. Throughout the disclosure, like reference numerals refer to like parts in the figures and embodiments of the present invention.

The present invention can be implemented in numerous ways, including such as for example a process; an apparatus; a system; a computer program product embodied on a computer-readable storage medium; and/or a processor, such as a processor suitable for executing instructions stored on and/or provided by a memory coupled to the processor. In this specification, these implementations, or any other form that the present invention may take, may be referred to as techniques. In general, the order of the operations of the disclosed processes may be altered within the scope of the present invention. Unless stated otherwise, a component such as a processor or a memory described as being suitable for performing a task may be implemented as a general device or circuit component that is configured or otherwise programmed to perform the task at a given time or as a specific device or as a circuit component that is manufactured or pre-configured or pre-programmed to perform the task. As used herein, the term 'processor' or the like refers to one or more devices, circuits, and/or processing cores suitable for processing data, such as computer program instructions.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described herein, the code or instructions for implementing the operations of the method embodiments may transform the computer, processor, controller, or other signal processing device into a special-purpose processor for performing any one of the methods herein.

If implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

A detailed description of various embodiments of the present invention is provided below along with accompanying figures that illustrate aspects of the present invention. The present invention is described in connection with such embodiments, but the present invention is not limited to any specific embodiment. The present invention encompasses numerous alternatives, modifications and equivalents of the disclosed embodiments. Numerous specific details are set forth in the following description in order to provide a thorough understanding of the present invention. These details are provided for the purpose of example; the present invention may be practiced without some or all of these specific details described herein. For clarity, technical material that is known in technical fields related to the present invention has not been described in detail so that the invention is not unnecessarily obscured.

FIG. 1 is a block diagram illustrating a data processing system 2 in accordance with one embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any of various types of electronic devices. In various embodiments, the host device 5 may be an electronic device such as for example a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may be a portable electronic device such as for example a mobile phone, a smart phone, an e-book, an MP3 player, a portable multimedia player (PMP), and/or a portable game player.

The memory system 10 may be implemented with any of various types of storage devices such as a solid state drive (SSD) and a memory card. In various embodiments, the memory system 10 may be provided as one of various components in an electronic device such as for example a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive through input/output lines a command CMD, an address ADDR and data DATA. The semiconductor memory device 200 may receive power PWR through a power line and a control signal CTRL through a control line. The control signal CTRL may include for example a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. In one embodiment of the invention, where the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
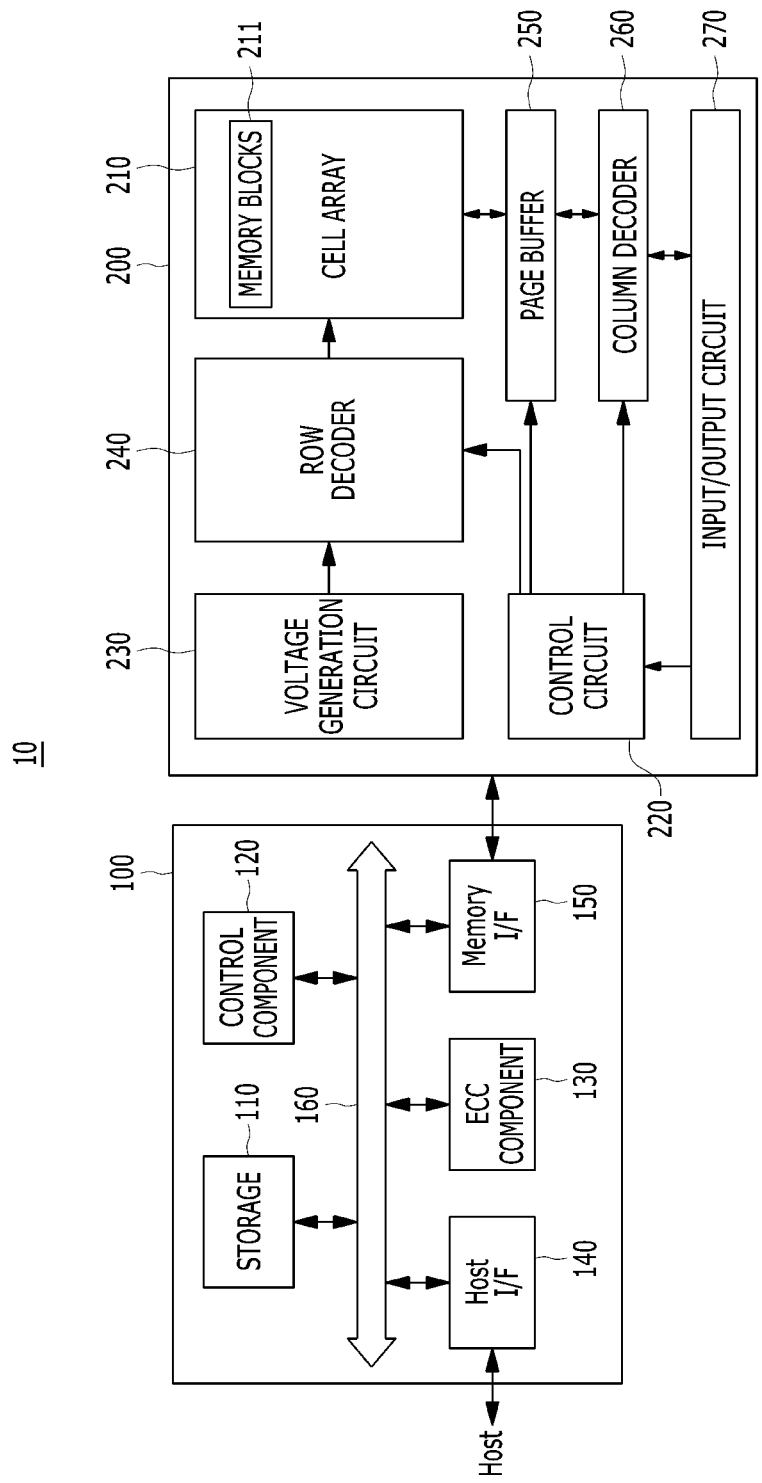
FIG. 2 is a block diagram illustrating a memory system.

FIG. 2 is a block diagram illustrating a memory system in accordance with one embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., a request from host device 5 of FIG. 1), and in particular, store data to be accessed by the host device.

The memory device 200 may store data to be accessed by the host device.

The memory device 200 may be implemented with a volatile memory device such as for example a dynamic random access memory (DRAM) and/or a static random access memory (SRAM) or a non-volatile memory device such as for example a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as for example a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and storage 110 may store data for driving the memory system 10 and the controller 100. For example, when the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware or other program instructions, which can be referred to as a flash translation layer (FTL), to control operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. In one embodiment, the ECC component 130 may not correct error bits when the number of the error bits is greater than or equal to a threshold number of correctable error bits, but instead may output an error correction fail signal indicating failure in correcting the error bits.

In various embodiments, the ECC component 130 may perform an error correction operation based on a coded modulation such as for example a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices suitable for error correction operation.

The host interface 140 may communicate with the host device through one or more of various communication standards or interfaces such as for example a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. In one embodiment where the memory device 200 is a flash memory such as a NAND flash memory, the memory interface 150 may generate control signals for the memory and process data under the control of the control component 120.

The memory device 200 as shown for example in FIG. 2 may include a memory cell array 210, a control circuit 220, a voltage generation circuit 230, a row decoder 240, a page buffer 250, which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform program, read, or erase operations of the memory cell array 210. The control circuit 220 may control the peripheral circuit.

The voltage generation circuit 230 may generate operational voltages of various levels. For example, in an erase operation, the voltage generation circuit 230 may generate operational voltages of various levels such as for example an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
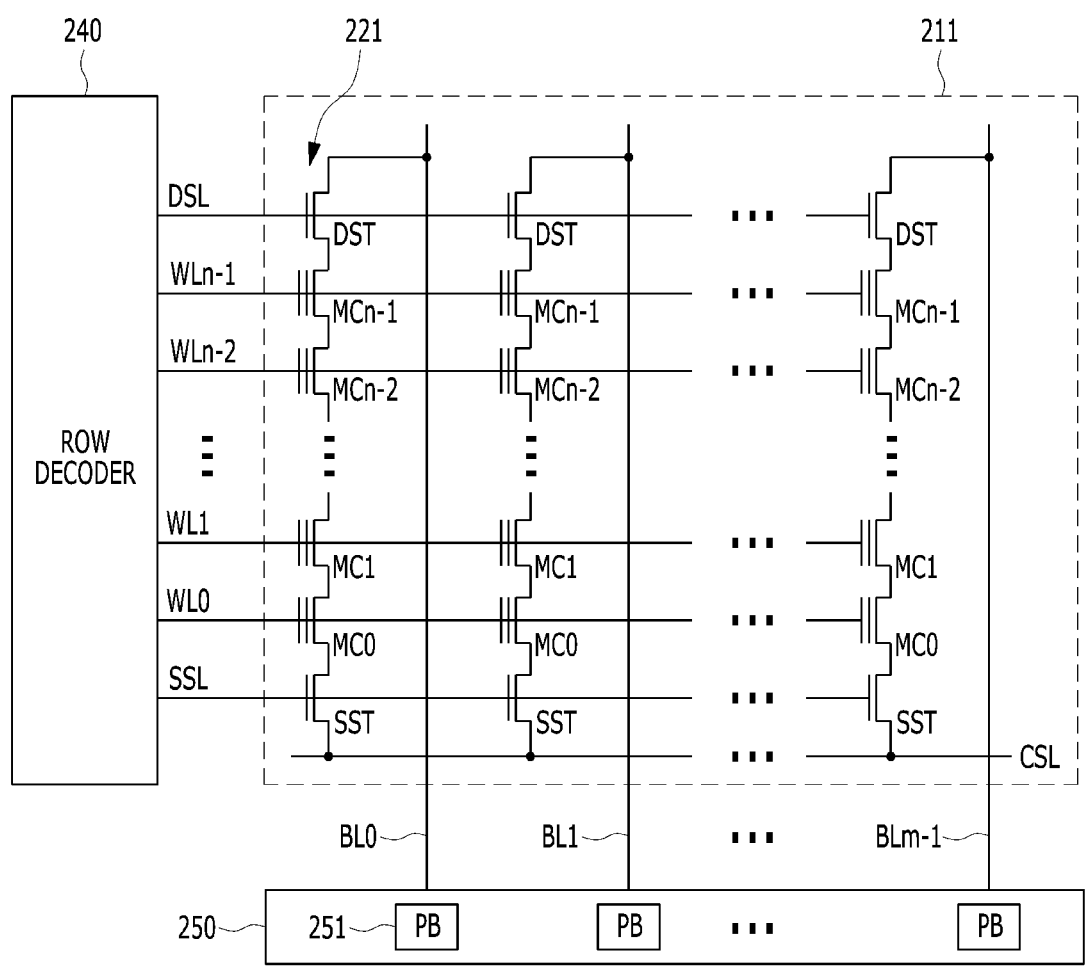
FIG. 3 is a circuit diagram illustrating a memory block of a memory device.

The page buffer 250 may be coupled with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or may transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device.

The control circuit 220 may control the peripheral circuit in response to the command and the address.

FIG. 3 is a circuit diagram illustrating a memory block of a semiconductor memory device in accordance with one embodiment of the present invention. For example, the memory block of FIG. 3 may be any of the memory blocks 211 of the memory cell array 210 shown in FIG. 2.

Referring to FIG. 3, the memory block 211 may include a plurality of word lines WL0 to WLn−1, a drain select line DSL and a source select line SSL coupled to the row decoder 240. These lines may be arranged in parallel, with the plurality of word lines between the DSL and SSL.

The memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm−1. The page buffers 251 may operate in response to page buffer control signals. For example, the page buffers 251 may temporarily store data received through the bit lines BL0 to BLm−1 or sense voltages or currents of the bit lines during a read or verify operation.

In various embodiments of the present invention, the memory blocks 211 may include a NAND-type flash memory cell. However, the memory blocks 211 are not limited to such cell type, and may include NOR-type flash memory cell(s). Memory cell array 210 may be implemented as a hybrid flash memory in which two or more types of memory cells are combined, or one-NAND flash memory in which a controller is embedded inside a memory chip.

In a heterogeneous memory system environment, if frequently accessed data is allocated to a relatively low speed memory, overall performance may be deteriorated or degraded compared to single memory system environment. Thus, a scheme is desired to avoid performance degradation of heterogeneous memory system environment.

Referring back to FIGS. 1 and 2, the data processing system (or computer system) 2 may use, as the memory system 10, a heterogeneous environment such as heterogeneous computing units and memory systems to guarantee requests of various performances due to the advent of various applications (e.g., internet of thing (IoT), artificial intelligence (AI), machine learning (ML), etc.). A heterogeneous memory system may include different memory devices to provide high operation speed and large capacity.

Figure 4A:
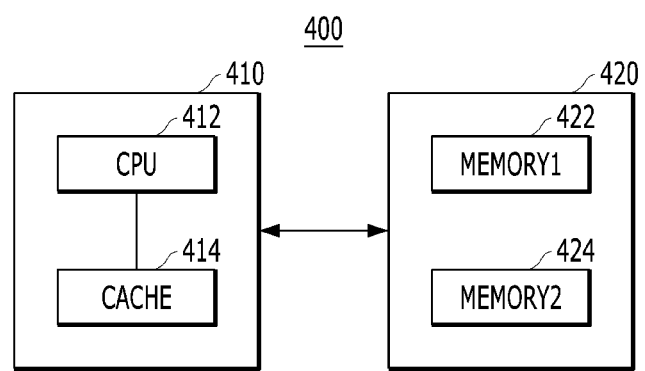
FIGS. 4A and 4B are diagrams illustrating a heterogeneous memory system in accordance with one embodiment of the present invention.
Figure 4B:
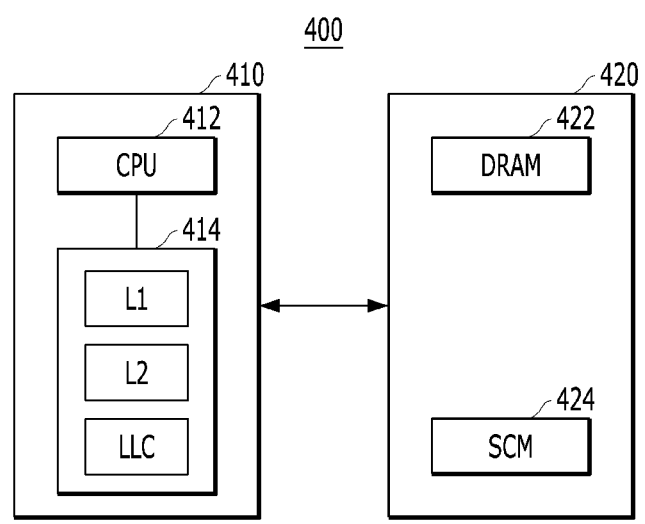

FIGS. 4A and 4B are diagrams illustrating a heterogeneous memory system 400 in accordance with one embodiment of the present invention.

Referring to FIG. 4A, the heterogeneous memory system 400 may include a controller 410 and a memory device 420. The controller 410 and the memory device 420 may correspond to the memory controller 100 and the memory device 200 of FIGS. 1 to 3, respectively.

The controller 410 may include a central processing unit (CPU) 412 and a cache 414. The CPU 412 and the cache 414 may correspond to the control component 120 and the storage 110 of FIG. 2. The controller 410 may include components other than the storage 110 and the control component 120 in FIG. 2. The cache 414 may allow instruction to be executed and data to be accessed (read and written) at higher speed than if the cache were not used according the techniques described herein. For this reason, instruction and data may be transferred from the memory device 420 to the cache 414 and may be stored (cached) in the cache 414. The cache 414 may be implemented with a volatile memory such as a static random access memory (SRAM) or a dynamic random access memory (DRAM).

In various embodiments of the present disclosure, the cache 414 may have a hierarchy of multiple cache levels. In the illustrated example of FIG. 4B without any limitation, the cache 414 may include a first level cache L1, a second level cache L2 and a third level cache L3 as a last (or highest) level cache LLC. Alternatively, the cache 414 may include a first level cache L1, a second level cache L2, a third level cache L3 and a fourth level cache L4 as an LLC.

The memory device 420 may include a first memory (MEMORY 1) 422 and a second memory (MEMORY 2) 424. The first memory 422 may support a first speed and a first capacity. The second memory 424 may support a second speed slower than the first speed and a second capacity greater than the first capacity. In the illustrated example of FIG. 4B without any limitation, the first memory 422 may be a DRAM and the second memory 424 may be a storage class memory (SCM). DRAM may provide a high operation speed while SCM may provide a large capacity. The SCM 424 may operate in various operating modes. For Intel®

Figure 5A:
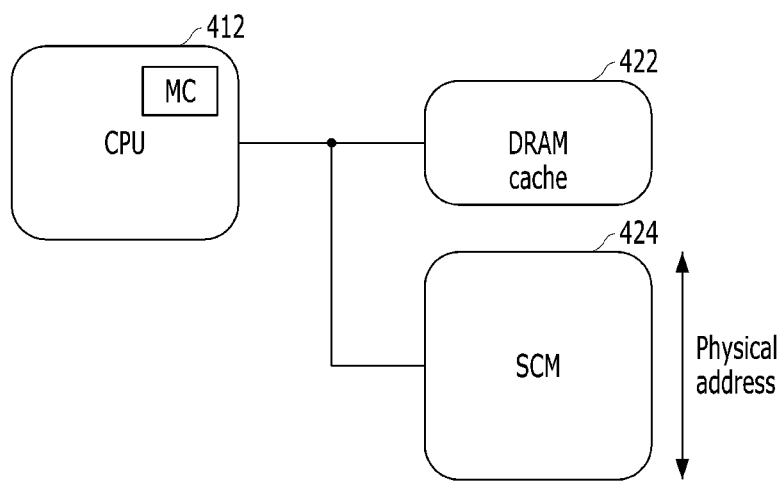
FIGS. 5A and 5B illustrate operation modes of a storage class memory of a heterogeneous memory system in accordance with another embodiment of the present invention.
Figure 5B:
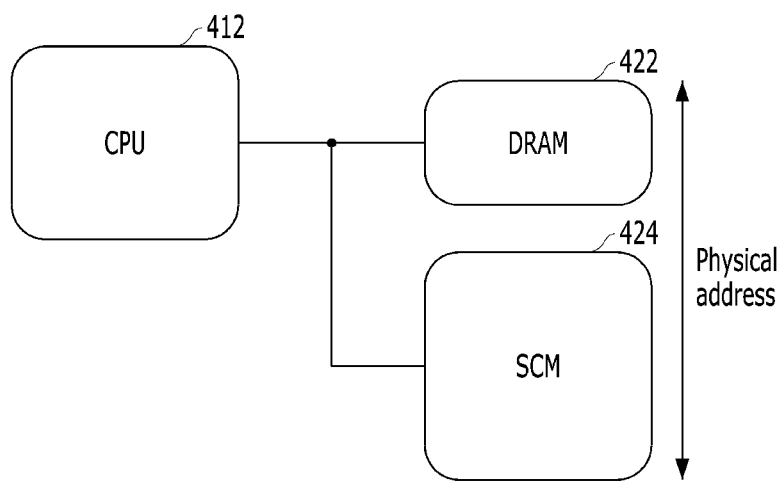

Optane™ memory, the SCM 424 may operate in a memory mode as shown in FIG. 5A or operate in an app direct mode as shown in FIG. 5B.

Referring to FIG. 5A, the SCM 424 may be used as a volatile main memory. The DRAM 422 may be a cache of the SCM 424 and perform an operation of caching recently used data associated with the SCM 424. The CPU 412 of FIG. 5A may include a component for managing the DRAM 422. In this example, memory regions available in operating system (OS), which may be executable by the CPU 412, may be the same as memory regions of the SCM 424. That is, a plurality of physical addresses for memory regions of the memory device 420 may correspond to physical addresses of the memory regions of the SCM 424.

Referring to FIG. 5B, both the DRAM 422 and the SCM 424 may be used as a main memory. The DRAM 422 may provide a volatile memory while the SCM 424 may provide a non-volatile memory. In this example, memory regions available in operating system (OS), which may be executable by the CPU 412 of FIG. 5B, may be the same as all or a part of memory regions of the DRAM 422 and memory regions of the SCM 424. That is, a plurality of physical addresses for memory regions of the memory device 420 may correspond to all or a part of physical addresses of the memory regions of the DRAM 422 and physical addresses of the memory regions of the SCM 424.

Referring back to FIGS. 4A and 4B, if frequently accessed data is allocated to the memory with low speed but large capacity, the overall performance of the heterogenous memory system 400 may be degraded compared to normal (homogeneous) memory systems. In order to guarantee various performance requests, in one embodiment of the invention, the heterogenous memory system 400 may provide a data tiering scheme capable of allocating frequently accessed data in the first memory 422 (i.e., a memory with high speed but a relatively smaller capacity or a first tier memory) and allocating non-frequently accessed data (i.e., normal access data) in the second memory 424 (i.e., a memory with low speed but a relatively larger capacity or a second tier memory). In embodiments of the present disclosure, the heterogenous memory system 400 may allocate frequently used data to the DRAM 422 and allocate non-frequently used data to the SCM 424.

The data tiering scheme may include periodically tracking a number of memory accesses per memory accessed address and may determine frequently accessed data or normal accessed data based on the number of memory accesses per unit time. Based on the determination result, the frequently accessed data may be allocated to the first memory 422 while the normal (less frequently) accessed data may be allocated to the second memory 424. The data tiering scheme may improve overall performance, e.g., a memory latency of a memory system.

Figure 6:
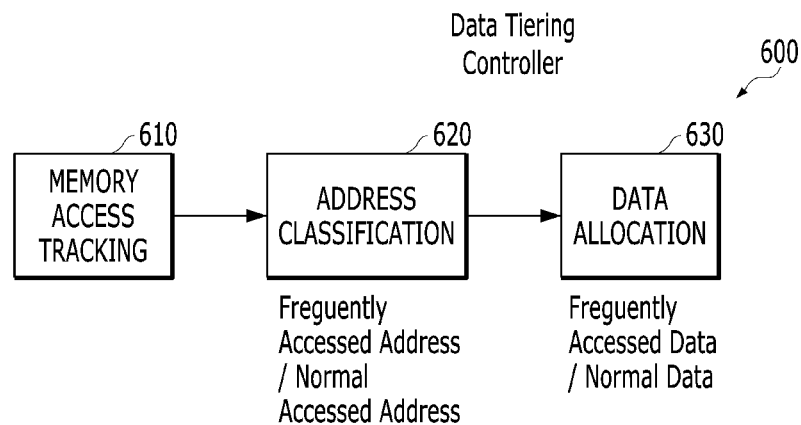
FIG. 6 is a diagram illustrating a data tiering controller in accordance with still another embodiment of the present invention.

FIG. 6 is a diagram illustrating a data tiering controller 600 in accordance with one embodiment of the present invention. The data tiering controller 600 may be implemented as software (SW) (or user level platform) or in an operating system (OS), which is executable by the CPU 412 of FIGS. 4A and 4B.

Referring to FIG. 6, the data tiering controller 600 may identify frequently accessed data (i.e., hot data) and normal data (i.e., cold data). Further, the data tiering controller 600 may allocate frequently accessed data and normal data to the first memory 422 and the second memory 424, respectively. In various embodiments of the present disclosure, the data tiering controller 600 may identify frequently accessed data and normal data based on memory access addresses and memory access numbers. In various embodiments of the present disclosure, the frequently accessed data may be data associated with frequently accessed address, and the normal data may be data associated with normal accessed address. Distinguishing or classifying between from frequently accessed address and normal accessed address is described in detail below. For these embodiments, the data tiering controller 600 may include a memory access tracking component 610, an address classification component 620 and a data allocation component 630. Each component may be implemented with a software module.

The memory access tracking component 610 may identify memory access addresses among a plurality of addresses for memory regions of the memory device 420. In various embodiments of the present disclosure, the memory access tracking component 610 may identify memory access addresses based on the following illustrated two approaches but other approaches which determine where data is being stored (and the frequency of access) in a memory device can be used. A first approach is to extract particular instructions (e.g., load/store instructions). A second approach is to extract a cache miss (i.e., LLC miss). A cache miss occurs when a request to retrieve data from a cache does not retrieve the requested data typically because the data was never written to the cache or the data had been removed or evicted from the cache. Failure to retrieve the data may indicate that the data could not be retrieved. As detailed later, statistical probabilistic data structures such as a set filter (e.g., a Bloom filter) may be used to determine if a memory address in a register is present or absent in the register.

In the first approach noted above, the memory access tracking component 610 may identify memory access addresses by extracting addresses for particular instructions associated with particular memory access operations. For example, the particular instructions may include load instruction and store instruction in a Linux/ARM embedded platform. Regardless of whether a miss of the CPU cache 414 (or a register) associated with a certain address of a main memory (i.e., the memory device 420) occurred, the following sequence of instructions is illustrative. A load or store instruction may be generated. A load instruction may allow an operation of reading data for a certain address from the memory device 420 to the CPU cache 414. A store instruction may allow an operation of a) reading data for a certain address from the memory device 420 to the CPU cache 414, b) updating the read data in the CPU cache 414, and then, in response to an eviction of data from the CPU cache 414, c) storing the updated data from the CPU cache 414 to the memory device 420. That is, load and store instructions are associated with accesses of the memory device 420. In the illustrated example of FIG. 7A, addresses associated with load and store instructions may be stored in a register 710A, which may be included in the CPU 412. The memory access tracking component 610 may identify memory access addresses by reading address values stored in the register 710A.

In the second approach, the memory access tracking component 610 may identify the memory access addresses by extracting information related to the occurrence of a miss of LLC (LLC miss) which caused address access to the memory device 420. Regardless of the fact that data was not retrieved, an LLC miss of the CPU cache 414 still may represent that access to a particular address of the memory device 420 occurred. In the illustrated example of FIG. 7B, the addresses associated with any LLC miss may be stored in a register 710B, which may be included in the CPU 412.

The memory access tracking component 610 may identify the memory access addresses by reading the address values stored in the register 710B.

For the first and second approaches above, address values can be tracked whenever a load/store instruction is generated or an LLC miss occurred. Alternatively, to reduce the overhead of tracking according to the first and second approaches described above, addresses of the memory device 420 may be extracted by using a sampling scheme to processor cache contents, which is described in Vaibhav Gogte et al., "Software Wear Management for Persistent Memories," 17$^{th}$ USENIX Conference on File and Storage Technologies, Boston, Mass., pp. 45-63, February 2019, which is incorporated by reference herein in its entirety.

Figure 7A:
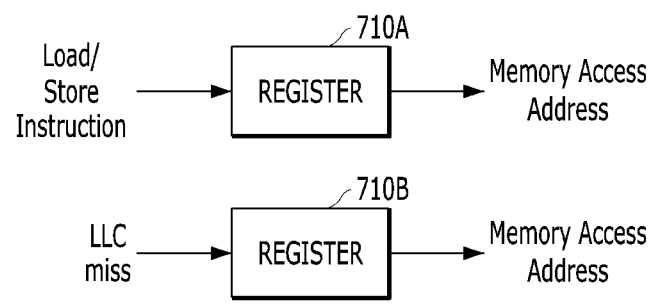
FIGS. 7A, 7B, 7C and 8 illustrate operations of a memory access tracking component in accordance with one embodiment of the present invention.
Figure 7B:
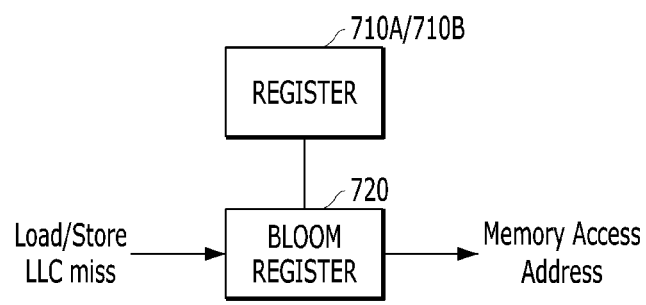

Referring to FIG. 7A, the memory access tracking component 610 may investigate all (or some) of the regions of the register 710A or 710B to determine whether a target address associated with a miss of a cache (i.e., a miss of the CPU cache 414 associated with load/store instructions or an LLC miss) exists in the register 710A or 710B. In various embodiments of the present disclosure, to identify the target address (i.e., memory access), the memory access tracking component 610 may use (or include) for example a Bloom filter 720 as shown in FIG. 7B. The Bloom filter 720 may be implemented as user level software (SW) or in an operating system (OS), which is executable by the CPU 412.

Referring to FIG. 7B, the Bloom filter 720 may be located in front of the register 710A or 710B. The Bloom filter 720 is a space-efficient probabilistic data structure capable of testing whether an element is a member of a set, e.g., that is if a particular data item among a large collection of data exists in a certain set.

Figure 7C:
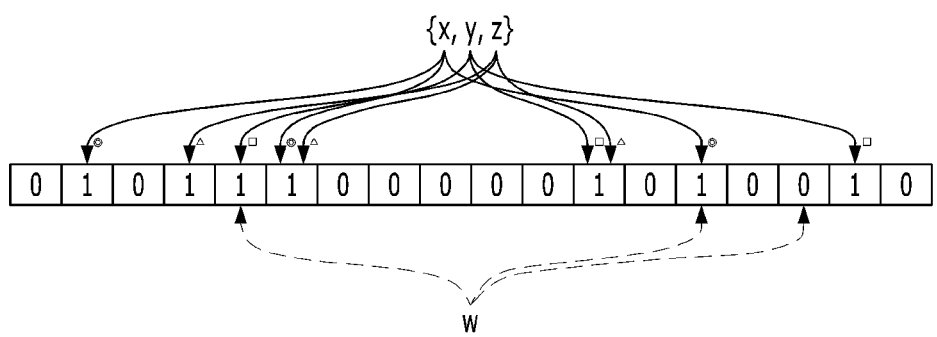

An example of the Bloom filter 720 representing the set {x,y,z} is illustrated in FIG. 7C. The solid arrows show the positions in a bit array of m bits (e.g., m=18) that each set element of the set {x,y,z} is mapped to. The element w with the dotted arrow is not in the set {x,y,z}, because it hashed to one bit-array position containing a "0" when it would need to have each of its hashed positions contain "1" to be indicative that the element w is in the set.

By using the Bloom filter 720, the memory access tracking component 610 may identify whether a particular data item among a large collection of data exists in a certain set, i.e., the memory access tracking component 610 can identify if a particular memory access address exists. For example, when an address corresponding to a load/store instruction exists in the Bloom filter 720, the memory access tracking component 610 may determine a CPU cache hit. When an address corresponding to load/store instruction does not exist in the Bloom filter 720, the memory access tracking component 610 may determine a CPU cache miss, and may then determine a memory access address associated with the cache miss. For a store instruction, since additional memory access occurred in response to an eviction of the CPU cache 414 as noted above, the memory access tracking component 610 may determine two memory accesses.

That is, the memory access tracking component 610 may determine whether a miss of the cache occurs by determining whether a target address (associated with the miss of the cache) exists in the Bloom filter 720 or if it is absent. When it is determined that the target address did not exist in the Bloom filter 720, the memory access tracking component 610 may identify the target address as one of the memory access addresses associated with a cache miss.

As the performance time of the Bloom filter 720 increases, the larger the probability of false positives. To avoid this phenomenon, the memory access tracking component 610 may periodically initialize the Bloom filter 720. When some data is inserted into the Bloom filter 720, the corresponding bits of bit mask in the Bloom filter 720 will be set to 1. When the Bloom filter 720 is initialized or reset, all bits of bit mask should be reset to 0. Generally, if the capacity of the cache 414 (e.g., LLC) is not enough, many LLC misses and memory accesses may occur. In consideration of this, the period of initialization of the Bloom filter 720 may be determined based on a number of accesses to the memory device 420, which correspond to occurrences of the miss of the cache 414, is equal to a number of blocks in the cache 414. That is, the Bloom filter 720 may be initialized when a number of data read from the memory device 420 for storing in the cache, which correspond to occurrences of the miss of the cache, is equal to the number of blocks in the cache.

As noted above, the memory access tracking component 610 may identify memory access addresses. Further, for a set period, the memory access tracking component 610 may track a number of memory accesses for each of the memory access addresses.

Figure 8:
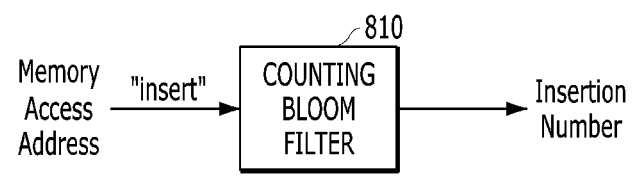

In various embodiments of the present disclosure, to track a number of memory accesses for each memory access address, the memory access tracking component 610 may use (or include) a counting Bloom filter 810 as shown in FIG. 8. The counting Bloom filter 810 may be a generalized data structure of a Bloom filter, that is used to test whether a count number of a given element is smaller than a given threshold when a sequence of elements is stored in a data set. The counting Bloom filter 810 may have the same structure as that of the Bloom filter 720, but may provide a number of insertions of a data item (e.g., memory access address) instead of determining whether the data item itself exists. The counting Bloom filter 810 may be implemented as user level software (SW) or in operating system (OS), which is executable by the CPU 412.

Referring to FIG. 8, for a set period, the memory access tracking component 610 may insert each of the memory access addresses to the counting Bloom filter 810. Further, the memory access tracking component 610 may track, as the number of memory accesses, an insertion number of the counting Bloom filter for each of the memory access addresses. That is, the memory access tracking component 610 may determine how many times a particular memory access address exists in a set of the counting Bloom filter 810. In other words, the Bloom filter counts the number of times that a particular address is re-listed in the register and returns that number.

In various embodiments of the present disclosure, the memory access tracking component 610 may periodically initialize the counting Bloom filter 810. The only difference between the Bloom filter 720 and the counting Bloom filter 810 is using bit mask or using counter. When data is inserted into the Bloom filter 720, corresponding bits of bit mask in the Bloom filer 720 may be set. However, when data is added into the counting Bloom filter 810, a corresponding counter may be increased in the counting Bloom filter 810. When the counting Bloom filter 810 is initialized or reset, all counters in the counting Bloom filter 810 should be reset to 0. For example, the period of initialization of the counting Bloom filter 8100 may be determined based on a number of accesses to the memory device 420, which corresponds to occurrences of the miss of the cache 414, is equal to a number of blocks in the cache 414. That is, the counting Bloom filter 720 may be initialized when a number of times that data read from the memory device 420 for storing in the cache, which corresponds to occurrences of the miss of the cache, is equal to the number of blocks in the cache. Further, the counting Bloom filter 720 may be initialized per program phase such that the address classification component 620 may perform a classification operation per program phase.

Referring back to FIG. 6, the address classification component 620 may classify each of the memory access addresses into a frequently accessed address or a normal accessed address based on the number of memory accesses, i.e., the insertion number of the counting Bloom filter 810. In various embodiments of the present disclosure, the address classification component 620 may classify each of the memory access addresses based on the comparing the number of memory accesses with a threshold (e.g., HOT_THRESHOLD).

Figure 9:
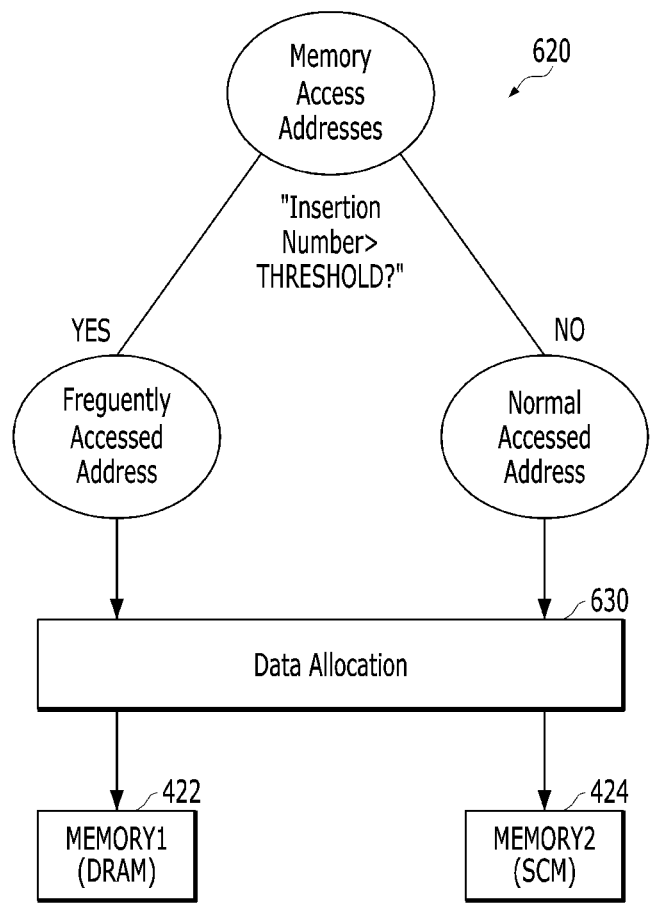
FIG. 9 illustrates operations of an address classification component and a data allocation component in accordance with another embodiment of the present invention.

For example, when the number of memory accesses for each memory address (e.g., the insertion number in the counting Bloom filter 810) is greater than or equal to the threshold HOT_THRESHOLD (YES in FIG. 9), the address classification component 620 may classify the memory address into the frequently accessed address. When the number of memory accesses for each memory address is less than the threshold HOT_THRESHOLD (NO in FIG. 9), the address classification component 620 may classify the memory address into non-frequently accessed address, i.e., the normal accessed address. In various embodiments of the present disclosure, the threshold HOT_THRESHOLD may be determined based on experimental results. Inventors observed from their experiments that the threshold HOT_THRESHOLD 5 or 10 showed good performance.

The data allocation component 630 may allocate the first memory 422 for frequently accessed data associated with the frequently accessed address and the second memory 424 for normal data associated with the normal accessed address. In various embodiments of the present disclosure, the first memory 422 may be a DRAM and the second memory 424 may be an SCM.

Figure 10:
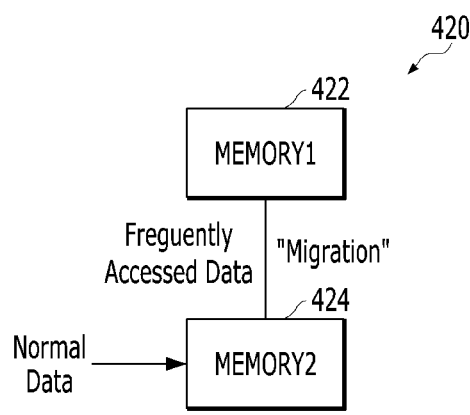
FIG. 10 illustrates a migration operation of a data allocation component in accordance with still another embodiment of the present invention.

Further, the data allocation component 630 may perform a data migration operation for the frequently accessed data. As shown in FIG. 10, the data allocation component 630 may migrate the frequently accessed data from the second memory 424 to the first memory 422. The normal data may be maintained in the second memory 424. If the first memory 422 is full, least recently used (LRU) data, which is stored in the first memory 422 and is not determined as the frequently accessed data, may be evicted to the second memory 424.

As noted above, the threshold HOT_THRESHOLD may be statically determined (i.e., static scheme) based on a characteristic of each application (e.g., a memory access pattern for each application). Instead of the static scheme above, the threshold HOT_THRESHOLD may be dynamically adjusted per program phase (i.e., dynamic scheme). This dynamic scheme may determine the threshold HOT_THRESHOLD using two overhead threshold values {e.g., lower_overhead_threshold, higher_overhead_threshold} to reduce overhead of performance time associated with the migration of the frequently accessed data. The threshold HOT_THRESHOLD may be adjusted such that the determination number for the frequently accessed data is located between a first overhead threshold (lower_overhead_threshold) and a second overhead threshold (higher_overhead_threshold). In various embodiments of the present disclosure, the second overhead threshold (higher_overhead_threshold) may be decided to follow 'initial threshold HOT_THRESHOLD×(higher_overhead_threshold)<1' and the first overhead threshold (lower_overhead_threshold) may be less than ⅓ of (higher_overhead_threshold).

Figure 11:
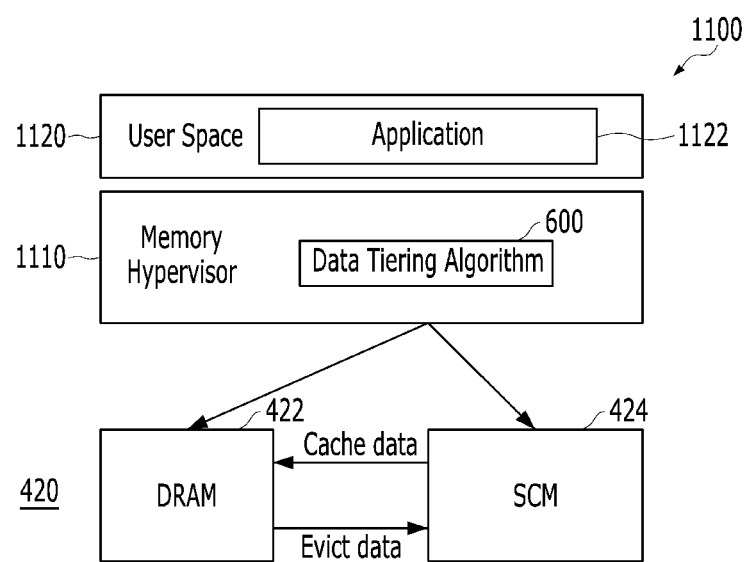
FIG. 11 illustrates a system including a memory hypervisor implementing a data tiering algorithm in accordance with one embodiment of the present invention.

FIG. 11 illustrates a system 1100 including a memory hypervisor implementing a data tiering algorithm in accordance with an embodiment of the present invention.

Referring to FIG. 11, the system 1100 may include a memory device 400, a memory hypervisor 1110 and a user space 1120. The memory device 400 may include the DRAM 422 as the first memory and the SCM as the second memory as shown in FIGS. 4A and 4B. The memory hypervisor 1110 and the user space 1120 may be elements of a host computer (e.g., a host device 5 in FIG. 1). The user space 1120 may provide one or more applications 1122. The memory hypervisor 1110 may be a logical platform for simultaneously executing multiple operating systems (OS) in the host computer. The memory hypervisor 1110 may include the data tiering controller (algorithm) 600 in FIG. 6.

The data tiering controller (algorithm) 600 may provide a data classification algorithm and a data allocation algorithm. The data classification algorithm may be performed by the memory access tracking component 610 and the address classification component 620 in FIG. 6. The data allocation algorithm may be performed by the data allocation component 630. For a set period, the data classification algorithm may classify frequently accessed data and normal data based on a number of memory accesses. The data allocation algorithm may migrate the frequently accessed data to the DRAM 422 and allocate the normal data to the SCM 424. The data tiering controller 600 may improve memory latency. A simulation environment for measuring performance of the data tiering controller 600 is shown in FIG. 12, and the performances measured in the simulation environment are shown in FIGS. 13A to 13C.

Figure 12:
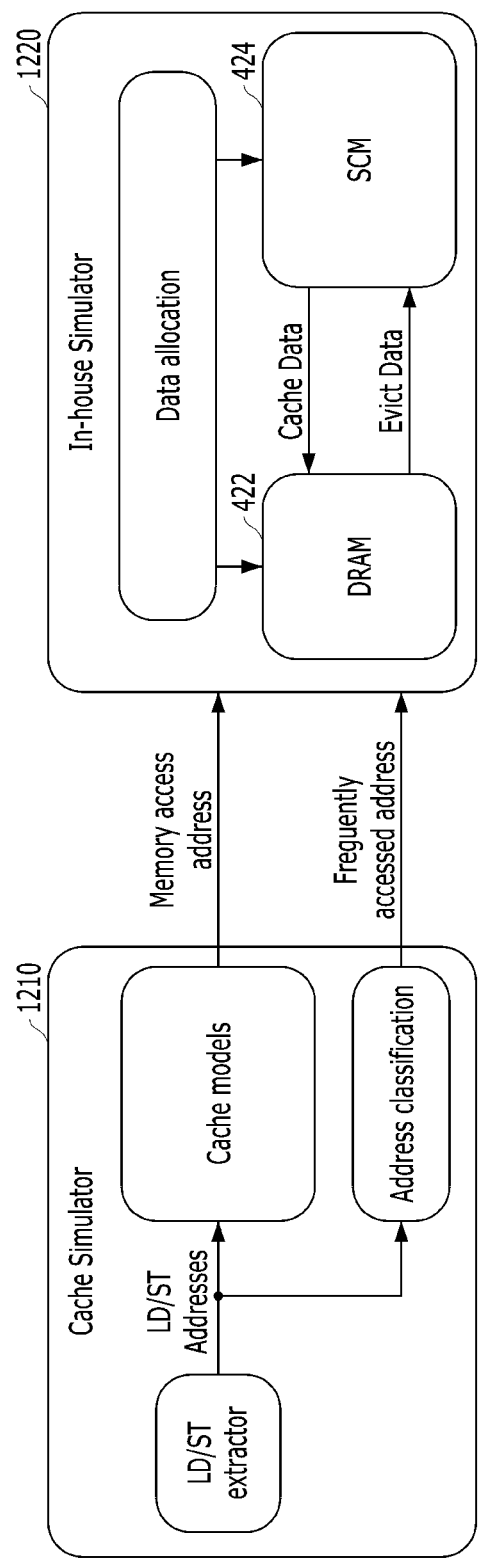
FIG. 12 illustrates a simulation environment for measuring performance of a data tiering controller in accordance with another embodiment of the present invention.

Referring to FIG. 12, the simulation environment may include a cache simulator 1210 and an in-house simulator 1220. The in-house simulator 1220 may provide a heterogeneous memory system environment including a DRAM and an SCM. The DRAM may be a cache of the SCM and a replacement algorithm thereof may follow a least recently used (LRU) scheme. The in-house simulator 1220 may implement a data allocation algorithm associated with the data allocation component 630 in FIG. 6.

The cache simulator 1210 may implement an address classification algorithm associated with the memory access tracking component 610 and the address classification component 620 in FIG. 6. The cache simulator 1210 may extract load (LD)/store (ST) addresses associated with LD/ST instruction to be used as an input of the address classification algorithm. Further, the cache simulator 1210 may extract memory access addresses to be used as an input of the data allocation algorithm.

Figure 13A:
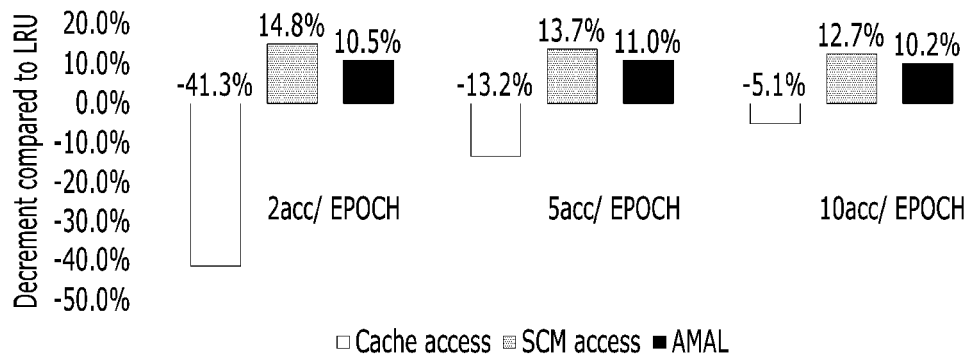
FIGS. 13A to 13C illustrate performance measurements of a data tiering controller in accordance with still another embodiment of the present invention.
Figure 13B:
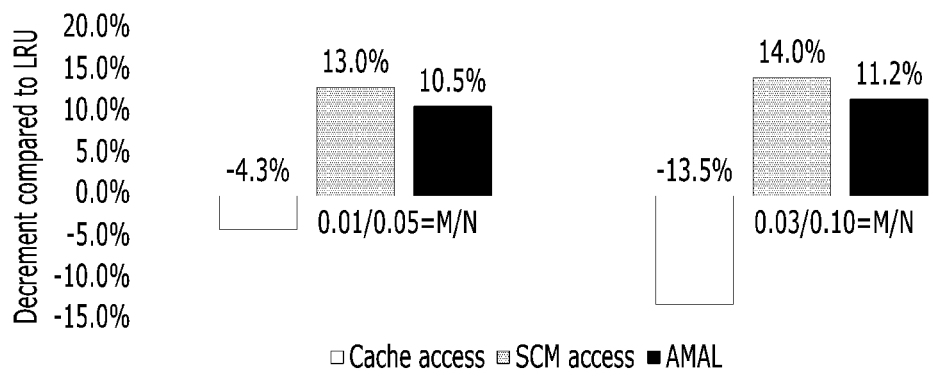
Figure 13C:
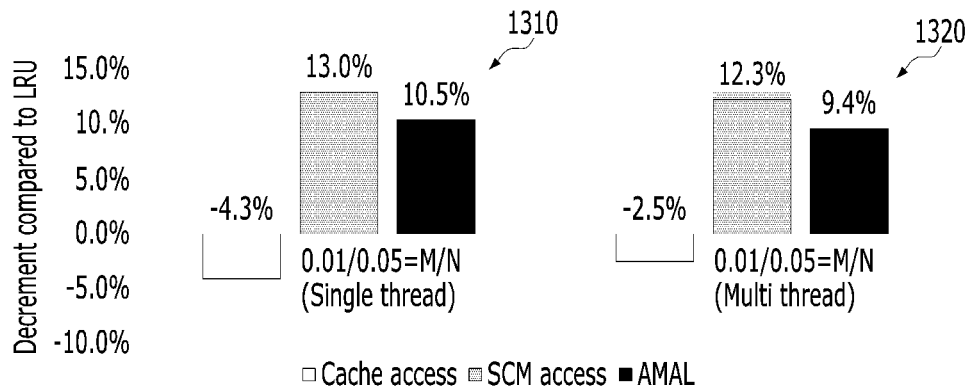

In FIGS. 13A to 13C, three (3) simulation metrics are used: "Cache access," "SCM access" and "AMAL." "Cache access" represents decrement of accesses for the first tier memory (DRAM 422) (i.e., a number of accesses to SCM cache) when the data allocation algorithm is applied to the system of FIG. 12, in comparison with a typical LRU caching scheme. "SCM access" represents decrement of accesses for the second tier memory (SCM 424) (i.e., a number of accesses to SCM) when the data allocation algorithm is applied to the system of FIG. 12, in comparison with the typical LRU caching scheme. "AMAL" represents decrement of total memory latency when the data allocation algorithm is applied to the system of FIG. 12, in comparison with the typical LRU caching scheme. The total memory latency may be: Total memory latency={Cache access× cache latency}+{SCM read access×SCM read latency}+

{SCM write access×SCM write latency}. For example, Cache latency=20 ns, SCM read latency=300 ns, SCM write latency=500 ns.

FIG. 13A illustrates performance measurement when the data tiering controller uses the address classification algorithm based on the static scheme.

In FIG. 13A, x-axis represents 3 simulation metrics of the data tiering controller, and y-axis represents performance measurements for three (3) simulation metrics of the data tiering controller in comparison with the LRU caching scheme. In x-axis, "N acc/EPOCH" represents that the threshold for the address classification algorithm is set to N, i.e., HOT_THRESHOLD=N (where N=2, 5 and 10).

Referring to FIG. 13A, it is illustrated that the access to the DRAM (i.e., first tier memory) 422 increases since frequently accessed data is allocated to DRAM 422. As the threshold HOT_THRESHOLD=N is lower, the amount of frequently accessed data increases and the amount of data cached to DRAM 422 increases. Thus, the number of accesses to DRAM 422 increases while the number of accesses to SCM 424 decreases. As a result, the data tiering controller decreases the number of accesses to SCM 424 through increasing efficiency of use of DRAM 422, thus decreasing the total memory latency by significant percentage, e.g., 10.5% for N=2, 11.0% for N=5 and 10.2% for N=10.

FIG. 13B illustrates performance measurement when the data tiering controller uses the address classification algorithm based on the dynamic scheme.

In FIG. 13B, x-axis represents 3 simulation metrics of the data tiering controller, and y-axis represents performance measurements for three (3) simulation metrics of the data tiering controller described herein in comparison with the LRU caching scheme. In x-axis, "M/N" is illustrated, in which M and N represent two threshold values for the dynamic address classification algorithm, i.e., lower_overhead_threshold and higher_overhead_threshold, respectively.

Referring to FIG. 13B, as the values of M and N increase, the threshold HOT_THRESHOLD decreases, thus increasing the amount of frequently accessed data allocated to DRAM 422. As the access to the DRAM (i.e., first tier memory) 422 increases, the number of cache accesses to DRAM 422 increases while the number of accesses to SCM 424 decreases. As a result, the data tiering controller decreases the number of accesses to SCM 424 through increasing efficiency of use of DRAM 422, thus decreasing the total memory latency by significant percentage, e.g., 10.5% for M/N=0.01/0.05 and 11.2% for M/N=0.03/0.10.

FIG. 13C illustrates performance measurement when the data tiering controller in various applications uses the address classification algorithm based on the dynamic scheme.

In FIG. 13C, 1310 represents the performance measurement for single threaded application and 1320 represents the performance measurement for multi-threaded applications. In the same way as shown in FIG. 13B, x-axis represents three (3) simulation metrics of the data tiering controller, and y-axis represents performance measurements for three (3) simulation metrics of the data tiering controller in comparison with the LRU caching scheme. In x-axis, "M/N" is illustrated, in which M and N represent two threshold values for the dynamic address classification algorithm, i.e., lower_overhead_threshold and higher_overhead_threshold, respectively.

Referring to FIG. 13C, both cases of single threaded application and multi-threaded applications increase the amount of frequently accessed data allocated to DRAM 422. As the access to the DRAM (i.e., first tier memory) 422 increases, the number of cache accesses to DRAM 422 increases while the number of accesses to SCM 424 decreases. As a result, the data tiering controller decreases the number of accesses to SCM 424 through increasing efficiency of use of DRAM 422, thus decreasing the total memory latency by significant percentage, e.g., 10.5% for M/N=0.01/0.05 in 1310 and 9.4% for M/N=0.01/0.05 in 1320.

FIG. 14 is a flowchart illustrating an operation 1400 of a data tiering controller in accordance with one embodiment of the present invention. In various embodiments of the present disclosure, the operation 1400 may be performed by the data tiering controller 600 in FIG. 6, i.e., the memory access tracking component 610, the address classification component 620 and the data allocation component 630. The operation 1400 may be performed for a memory device (e.g., the memory device 420 in FIGS. 4A and 4B) including a first memory supporting a first speed and a first capacity, and a second memory supporting a second speed slower than the first speed and a second capacity greater than the first capacity. In the illustrated example of FIGS. 4A and 4B, the memory device 420 may include the first memory 422 (e.g., DRAM) and the second memory 424 (e.g., SCM).

Referring to FIG. 14, at operation 1410, the memory access tracking component 610 may identify memory access addresses among a plurality of addresses for memory regions of the memory device 420.

At operation 1420, the memory access tracking component 610 may track, for a set period, a number of memory accesses for each of the memory access addresses.

At operation 1430, the address classification component 620 may classify each of the memory access addresses into a frequently accessed address or a normal accessed address based on the number of memory accesses in the set period.

At operation 1440, the data allocation component 630 may allocate the first memory for frequently accessed data associated with the frequently accessed address and the second memory for normal data associated with the normal accessed address.

As described above, embodiments provide a data tiering scheme capable of improving performance of heterogeneous memory system environment. The data tiering scheme may classify frequently accessed addresses and allocate data associated with the frequently accessed addresses to a memory supporting a relatively high speed (fast latency). Further, the data tiering scheme may identify and track the frequently accessed addresses using a set filter (i.e., a Bloom filter and a counting Bloom filter). The data tiering scheme described herein may improve total memory latency of the heterogeneous memories.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives of the disclosed embodiment. Furthermore, the disclosed embodiments may be combined to form additional embodiments.

What is claimed is:

1. A memory system comprising:
   a memory device including a first memory supporting a first speed and a first capacity, and a second memory supporting a second speed slower than the first speed and a second capacity greater than the first capacity; and a controller including a cache, and coupled to the memory device and configured to:

determine whether a miss of the cache occurs;

determine whether a target address associated with the miss of the cache exists in a set Bloom filter; and when it is determined that the target address did not exist in the Bloom filter, identify the target address as one of memory access addresses among a plurality of addresses for memory regions of the memory device;

track, for a set period, a number of memory accesses for each of the memory access addresses;

classify each of the memory access addresses into a frequently accessed address or a normal accessed address based on the number of memory accesses in the set period; and allocate the first memory for frequently accessed data associated with the frequently accessed address and allocate the second memory for normal data associated with the normal accessed address.

2. The memory system of claim 1, wherein the first memory is a dynamic random access memory (DRAM) and the second memory is a storage class memory (SCM).

3. The memory system of claim 1, wherein the plurality of addresses corresponds to memory regions of the DRAM and memory regions of the SCM or corresponds to memory regions of the SCM.

4. The memory system of claim 1, wherein the cache includes a last level cache (LLC) of the controller.

5. The memory system of claim 1, wherein the controller is configured to periodically initialize the Bloom filter.

6. The memory system of claim 5, wherein the controller is configured to initialize the Bloom filter when a number of times that data that the cache has read from the memory device, which corresponds to occurrences of the miss of the cache, is equal to a number of blocks in the cache.

7. The memory system of claim 1, wherein the controller is configured to:

for the set period, insert each of the memory access addresses to a set counting Bloom filter; and track, as the number of memory accesses, an insertion number of the counting Bloom filter for each of the memory access addresses.

8. The memory system of claim 7, wherein the controller is configured to periodically initialize the counting Bloom filter.

9. The memory system of claim 8, wherein the controller is configured to initialize the counting Bloom filter when a number of accesses to the memory device, which corresponds to occurrences of the miss of the cache, is equal to a number of blocks in the cache.

10. The memory system of claim 1, wherein the controller is configured to classify each of the memory access addresses into the frequently accessed address when a number of memory accesses thereof is greater than or equal to a threshold, and wherein the controller is configured to classify each of the memory access addresses into the normal accessed address when the number of memory accesses thereof is less than the threshold.

11. The memory system of claim 1, wherein the controller is further configured to migrate the frequently accessed data from the second memory to the first memory.

12. The memory system of claim 10, wherein the controller is configured to adjust the threshold such that a number of the frequently accessed data is located between a lower overhead threshold and a higher overhead threshold.

13. A method for operating a heterogeneous memory system, which includes a memory device and a controller including a cache, the method comprising:

identifying memory access addresses among a plurality of addresses for memory regions of a memory device, which includes a first memory supporting a first speed and a first capacity, and a second memory supporting a second speed slower than the first speed and a second capacity greater than the first capacity;

tracking, for a set period, a number of memory accesses for each of the memory access addresses;

classifying each of the memory access addresses into a frequently accessed address or a normal accessed address based on the number of memory accesses in the set period; and allocating the first memory for frequently accessed data associated with the frequently accessed address and allocating the second memory for normal data associated with the normal accessed address, wherein the identifying memory access addresses comprises:

determining whether a miss of the cache occurs;

determining whether a target address associated with the miss of the cache exists in a set Bloom filter; and when it is determined that the target address did not exist in the Bloom filter, identifying the target address as one of the memory access addresses.

14. The method of claim 13, wherein the first memory is a dynamic random access memory (DRAM) and the second memory is a storage class memory (SCM), and wherein the plurality of addresses corresponds to memory regions of the DRAM and memory regions of the SCM or correspond to memory regions of the SCM.

15. The method of claim 13, wherein the tracking a number of memory accesses includes:

for the set period, inserting each of the memory access addresses to a set counting Bloom filter; and tracking, as the number of memory accesses, an insertion number of the counting Bloom filter for each of the memory access addresses.

16. The method of claim 15, further comprising: initializing the Bloom filter and the counting Bloom filter when a number of accesses to the memory device, which corresponds to occurrences of the miss of the cache, is equal to a number of blocks in the cache.

17. The method of claim 13, wherein the classifying each of the memory access addresses includes:

classifying each of the memory access addresses into the frequently accessed address when a number of memory accesses thereof is greater than or equal to a threshold, and classifying each of the memory access addresses into the normal accessed address when the number of memory accesses thereof is less than the threshold.

18. The method of claim 13, wherein the allocating the first memory and the second memory includes migrating the frequently accessed data from the second memory to the first memory.

* * * * *